United States Patent
Wales et al.

[11] Patent Number: 6,088,344
[45] Date of Patent: Jul. 11, 2000

[54] PACKET RADIO SYSTEMS

[75] Inventors: Stephen William Wales, Southampton; Eric Murray, Sherfield English, both of United Kingdom

[73] Assignee: Roke Manor Research Limited, Hants, United Kingdom

[21] Appl. No.: 08/880,889

[22] Filed: Jun. 23, 1997

[30] Foreign Application Priority Data

Jun. 26, 1996 [GB] United Kingdom .................. 9613405

[51] Int. Cl.[7] ...................................... H04J 4/00
[52] U.S. Cl. .................. 370/329; 370/437; 370/522; 455/450; 455/509; 455/515
[58] Field of Search ...................... 370/329, 431, 370/437, 468, 522; 455/517, 515, 510, 450, 452, 509

[56] References Cited

U.S. PATENT DOCUMENTS

| | | | |
|---|---|---|---|
| 5,166,929 | 11/1992 | Lo | 370/85.3 |
| 5,561,851 | 10/1996 | Hubbell et al. | 455/54.1 |
| 5,642,353 | 6/1997 | Roy, III et al. | 370/329 |

FOREIGN PATENT DOCUMENTS

| | | |
|---|---|---|
| 0619664A2 | 10/1994 | European Pat. Off. . |
| WO95/35637 | 12/1995 | WIPO . |

OTHER PUBLICATIONS

L. Kleinrock et al. "An Optimal Adaptive Scheme for Multiple Access Broadcast Communication", paper presented at the International Communications Conference, 1978, pp. 7.2.1–7.2.5.

*Primary Examiner*—Huy D. Vu
*Assistant Examiner*—Dung Trinh
*Attorney, Agent, or Firm*—Evenson, McKeown, Edwards & Lenahan, P.L.L.C.

[57] ABSTRACT

A method and apparatus for use in a packet radio system is provided wherein a time for providing a plurality of users of the system with acknowledgement data appertaining to successful transmission of packets of data bearing radio signals is large in comparison with a rate of demand for communication of data, and wherein authorisation for transmission of packets is based on an estimate of a number of active users. The method and apparatus provides the users with an estimate of the number active users, calculated in accordance with an average number of acknowledgements received during a predetermined time.

19 Claims, 4 Drawing Sheets

PACKET RADIO SYSTEMS

The present invention relates to packet radio systems, wherein users are provided with a means for communicating by transmitting bursts of information bearing radio signals on common communication channels.

Packet radio systems operate to provide a facility for a plurality of users to transmit bursts of information bearing radio signals on a common communication channel. The bursts of radio signals, which are known as packets, are detected at a receiver embodied within a central or hub station. The hub station is positioned so as to provide a radio signal propagation path for packets transmitted by the users to the receiver. In a situation where users are distributed at various points over the earth's surface, the hub station of a packet radio system is often embodied within a geostationary satellite in order to provide a necessary radio propagation path to users of the system.

In order to schedule transmissions of packets from a plurality of users, packet radio systems are provided with a multiple access scheme which operates to arrange for the packets to be transmitted by the users so that with high probability packets are not transmitted contemporaneously. Packets which are transmitted contemporaneously are likely to interfere at the receiver of the hub station, preventing communication from any user. A contemporaneous transmission of packets therefore results in the packets being lost, and is hereinafter referred to as a collision.

There are a plethora of multiple access schemes known to those skilled in the art. For example, time division multiple access operates and arranges for users of a packet radio system to transmit packets in predetermined time periods or 'slots' and wherein the users transmit packets in the time slots in a predetermined order. On the other hand, a multiple access protocol known as ALOHA provides a means whereby users within the system are able to transmit at any time. Users are provided with a means for detecting collisions, in which case each user waits for a random time period before re-transmitting. However in other packet radio systems physical constraints prevent users from detecting collisions. In such a case the packet radio system is provided with a feedback channel. The feedback channel is used by the hub station to indicate whether a collision has occurred, or alternatively the hub station is provided with a means for indicating a successfully received packet by transmitting acknowledgement data to the user on the feed-back channel. The acknowledgement data comprises an indication of whether a packet was received successfully or not, and a representation of the user which transmitted the packet. In this context a successful transmission means that a packet was received at the receiver of the hub station and from which data represented by the packet was recovered.

The selection of an appropriate multiple access scheme is dependant upon the physical characteristics in which the packet radio system is required to operate.

In some packet radio systems users are provided with a multiple access scheme which operates to schedule transmission of packets in dependence upon a number of users which are active during a given time slot. This information is used to reduce a probability of collisions. An example of such a multiple access scheme is described in a paper by Kleinrock and Yemini, entitled 'An optimal adaptive scheme for multiple access broadcast communications' presented at the International Communications Conference 1978, at 7.2.1. This paper describes as a multiple access scheme hereinafter known as the Urn protocol. The Urn protocol provides users with access to the common communication channel in accordance with an assessment of the number of active users in combination with numbers randomly drawn from a set of numbers. Each number of the set of numbers represents a user of the system. To provide users with information appertaining to the number of active users in the system, an ancillary control channel may be provided, wherein a user may transmit data indicative of activity within a given time slot. All users are provided with a means for detecting the ancillary control channel and thereby calculating the number of active users. However the provision of such an ancillary control channel has the disadvantage in that this requires provision of extra radio frequency bandwidth, which may be unavailable. For this reason it is often preferable to assess the number of active users from acknowledgements transmitted by the hub station on the feedback channel in the aforementioned manner. However where the hub station is embodied within a geostationary satellite, a delay in providing acknowledgement data for packets via the feed-back channel, resulting from the propagation time of the packet to the hub station and the acknowledgement from the hub station to the user will be high compared to the rate of demand for subsequent packets to be transmitted. This situation may lead to instability in the packet radio system, in that packets for communication will be queued, which may in turn cause all users to become active, thereby attempting to access the common communication channel contemporaneously, resulting in communications being blocked. Stability as used herein with reference to a packet radio system is hereby defined as being a feature of the packet radio system appertaining to its operation, relating to a control of a delay experienced by packets during transmission, and a rate of communicating packets by users, and maintenance of this delay and rate to a level which is acceptable to users of the system.

It is an object of the present invention to provide advantages to a packet radio system wherein a time delay for providing information appertaining to successful transmission of packets is large in comparison with a rate of demand for packets to be transmitted.

According to the present invention a multiple access method for use in a packet radio system wherein a time for providing a plurality of users of the system with acknowledgement data appertaining to successful transmission of packets of data bearing radio signals is large in comparison with a rate of demand for communication of data, which multiple access method comprises steps of (i) determining a total number of users N which have been registered with the system (ii) communicating the total number of users N to all users in the system, characterised by the steps of (iii) for each user determining whether the user has permission to transmit a packet in a predetermined time period in accordance with the total number of users N and a number of active users n, (iv) monitoring the acknowledgement data, (v) for each user estimating the number of active users n, from the acknowledgement data received by the user in a predetermined time period.

According to another aspect of the present invention there is provided a transmission scheduler for use within each of a plurality of user units of a packet radio system, the packet radio system including a common communication channel for providing the user units with a means for transmitting packets of data bearing radio signals in predetermined time periods, and a hub station which operates to detect the data packets and transmits acknowledgement data appertaining to a successful transmission of a data packet by a user unit, wherein a delay between a user unit transmitting a data packet and receiving corresponding acknowledgement data is large in comparison with a rate at which user units are required to communicate data packets, characterised in that the transmission scheduler comprises, a monitor means which operates to monitor acknowledgement data transmitted by the hub station, a load sensor means which operates to generate load data representative of a number of active user units with data packets to be transmitted, an access calculator which operates to generate authorisation data in dependence upon the load data, which authorisation data is indicative of users which are provided with permission to transmit, and a transmitter which operates to transmit a data packet in dependence upon the authorisation data, wherein the load sensor means comprises a data processor means which operates to generate the load data in dependence upon an average number of acknowledgement data received in a pre-determined time, thereby providing the packet radio system with a means for stable operation in spite of the delay in receiving acknowledgements.

By providing users of the packet radio system with a transmission scheduler which operates to monitor and store acknowledgement data transmitted to users by the hub station, and which operates to calculate an estimate of a number of users which are active in accordance with an average number of acknowledgements, the packet radio system is provided with a means for operating in a stable state in spite of the large delays in receiving acknowledgement data.

In a practical situation errors may be introduced into the acknowledgements during transmission which may cause errors to be introduced into the estimation of the number of active users.

The urn protocol is an example of a multiple access scheme which operates to schedule transmissions of packets in accordance with an assessment of the number of active users in combination with numbers drawn from a pre-determined set of numbers. Each user is arranged to draw the same set of numbers from the pre-determined set, by providing each user with the same number selection algorithm. This might be for example a pseudo-random number generator, which is arranged to draw the same numbers, by providing each user with the same initialisation seed. In order for such an algorithm to operate effectively therefore, each user must draw the same set of numbers from the pre-determined set of numbers contemporaneously. If the number of numbers drawn from the pre-determined set in accordance with the selection algorithm is determined in dependence upon the estimate of the number of active users, then any error in the estimate of the number of active users may result in a user drawing a different set of numbers from the pre-determined set than the other users of the system. Such a user would therefore be out of synchronisation in terms of the numbers drawn from the pre-determined set, which may result in a significant increase in a number of collisions on the common communications channel. Some tolerance due to errors in the acknowledgements may be provided by estimating the number of active users in accordance with an average number of acknowledgements as aforementioned, however this may not obviate a requirement for users to re-synchronise number selection algorithms in a case where synchronisation is lost.

According to yet another aspect of the present invention, there is provided a method of maintaining synchronisation of a plurality of transmission schedulers embodied within a corresponding plurality of user units, which transmission schedulers operate to schedule transmissions of packets of data bearing radio signals on a common communications channel in accordance with acknowledgement data received from a hub station appertaining to successfully transmitted packets, and in accordance with a set of numbers drawn from a pre-determined set of numbers, each of which pre-determined set of numbers being representative of a user unit with permission to transmit packets, the said method may comprise the steps of;

(i) monitoring the packets received by the hub station, (ii) generating monitor data representative of user units which have transmitted packets during a pre-determined synchronisation period, (iii) generating prediction data representative of the user units which should have transmitted packets in accordance with the operation of the said plurality of transmission schedulers, (iv) transmitting re-synchronisation data to all user units at the end of the said pre-determined synchronisation period when the monitor data in combination with prediction data indicates that at least one of the transmission schedulers is out of synchronisation.

According to yet a further aspect of the present invention, there is provided packet radio system, comprising a common communications channel for providing a plurality of user units with a means for transmitting packets of data bearing radio signals in predetermined time periods, and a hub station which operates to detect the data packets and transmit acknowledgement data appertaining to successfully transmitted packets, wherein each of the said plurality of user units is provided with a transmission scheduler, which transmission schedule operates to schedule transmissions of packets in accordance with the acknowledgement data in combination with numbers drawn from a predetermined set of numbers, each of which predetermined set of numbers represents a user unit, and wherein the hub station comprises a packet predictor which operates to generate prediction data representative of user units which in accordance with the numbers drawn from the pre-determined set of numbers should have transmitted packets, a packet monitor means, which operates to detect which user units have transmitted packets within a pre-determined synchronisation period, and a re-synchronisation detector which operates in combination with the packet predictor and the packet monitor means to transmit re-synchronisation data to user units at the end of the pre-determined synchronisation period when the prediction data indicates that at least one transmission scheduler is out of synchronisation.

One embodiment of the present invention will now be described with reference to the accompanying drawings, wherein.

Figure 1:
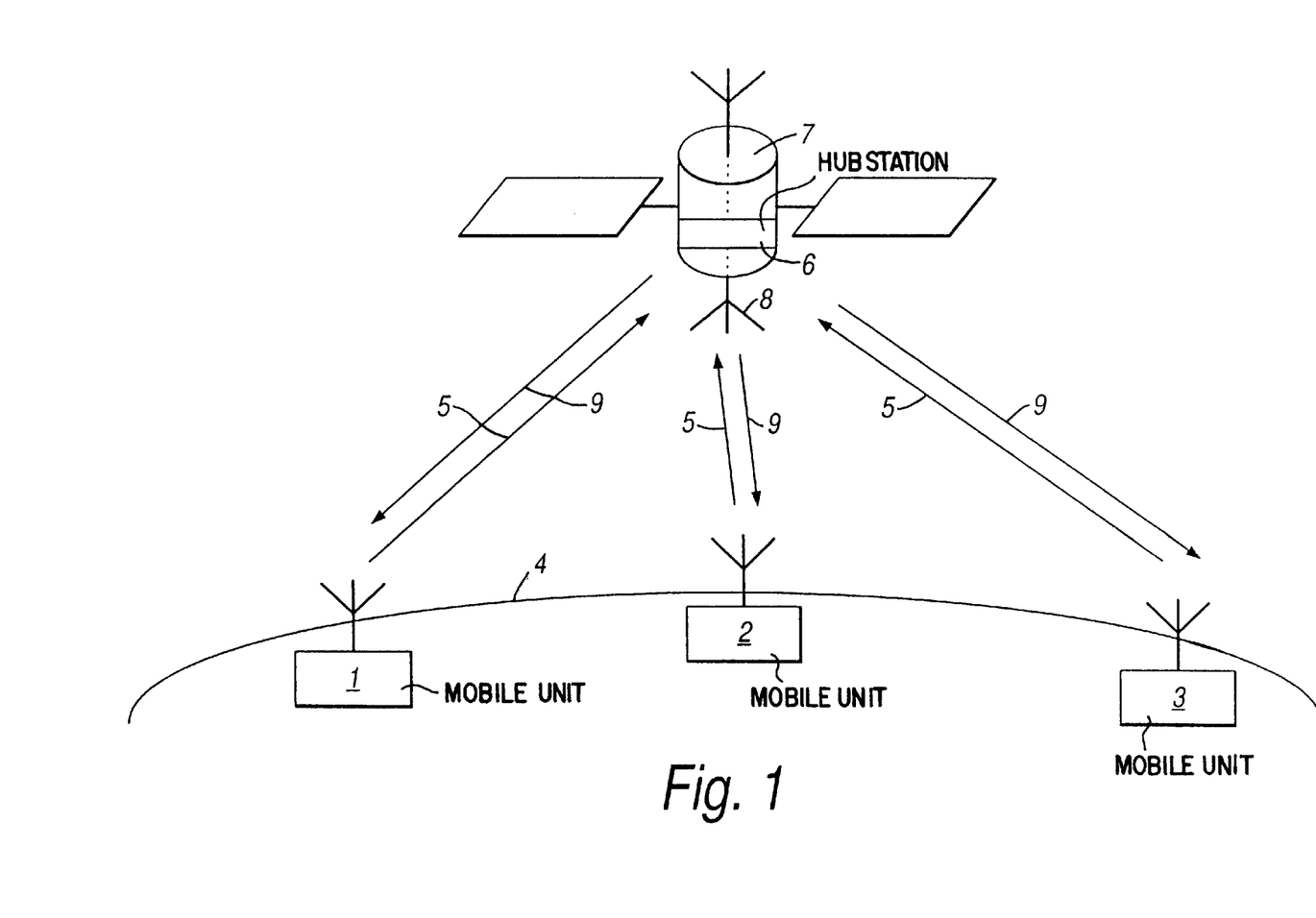
FIG. 1 is a conceptual block diagram of a packet radio system providing communications for a plurality of user units distributed over the earth's surface.

An illustration of an arrangement for providing communication to users distributed over the earth's surface with a packet radio system can be seen in FIG. 1. In FIG. 1 mobile units 1, 2, 3, are shown to be situated at different places on the earth's surface 4. The mobile units 1, 2, 3, are arranged to communicate by transmitting packets of radio signals on a common communications channel represented as a conceptual line 5, with a hub station 6, arranged to be embodied within the satellite 7. The arrangement of the satellite 7, orbiting the earth above the mobile units 1, 2, 3, provides a facility whereby high frequency or microwave signals may be detected by the hub station 6, through an antenna 8, embodied within the satellite 7, and forwarded to other mobile units or retained in the satellite for further transmission. Acknowledgements indicative of successfully received packets, are transmitted by the hub station 6, to the mobile units 1, 2, 3, via a feed-back communication channel represented by the conceptual line 9. Although in the example diagram shown in FIG. 1, the packet radio system is arranged to operate with mobile units 1, 2, 3 sited on the earth's surface, the mobile units 1,2, 3, may be either fixed earth stations or mobile.

As an example embodiment, the invention will be described by way of example with reference to a packet radio system provided with a multiple access scheme operating in accordance with the urn protocol hereinbefore mentioned. An explanation of the urn protocol is provided as follows:

If the total number of users within the packet radio system is designated N, then out of these N users, only a sub-set number designated n, out of these N users will be active. An active user is defined as a user which has data waiting to be transmitted over the packet radio system. The common communications channel 5, on which packets are transmitted, is divided into a number of predetermined time slots. The duration of the time slots is equal to the duration of the packets transmitted by any user. In any one time slot, only k of the N users are provided with access rights. An access right is the right to transmit in a given time slot. The number of users given access rights k, is calculated in accordance with equation 1.

$$k = \left\lfloor \frac{N}{n} \right\rfloor \quad (1)$$

where $\lfloor x \rfloor$ is the nearest integer $\leq x$.

Each user within the system is provided with a pseudo random number generator which generates numbers in accordance with a predetermined order. Each user within the system is provided with a unique identification number. At an initialisation stage, each of the users is provided with a means whereby it can generate the N numbers which are held within a conceptual urn. Each user then calculates the value of k and draws k numbers from the urn. The k numbers are in fact generated by the pseudo random number generator which is arranged to provide those k unique numbers from N. Users of the packet radio system thereafter analyse the k numbers, and any user which has an identification number which is one of those k numbers, is provided with permission to transmit and proceeds to transmit its packet in the given time slot. The protocol thereafter proceeds in a similar manner until all N numbers have been drawn from the conceptual urn, at which point a reset of the system is established and the urn is once again full with the N numbers.

The mobile users 1, 2, 3, are therefore provided with a means for calculating k, and generating a corresponding set of k identification numbers. By providing the mobile users 1, 2, 3 in conjunction with the hub station contained in the satellite 7, with a multiple access scheme operating in accordance with the urn protocol herein-before described, information bearing radio packets may be transmitted by the users to the hub station 6, embodied in the satellite 7, in a stable manner. The urn protocol provides advantages in terms of a rate of throughput of data bearing radio packets and delay experienced by the radio packets in waiting for transmission.

Figure 2:
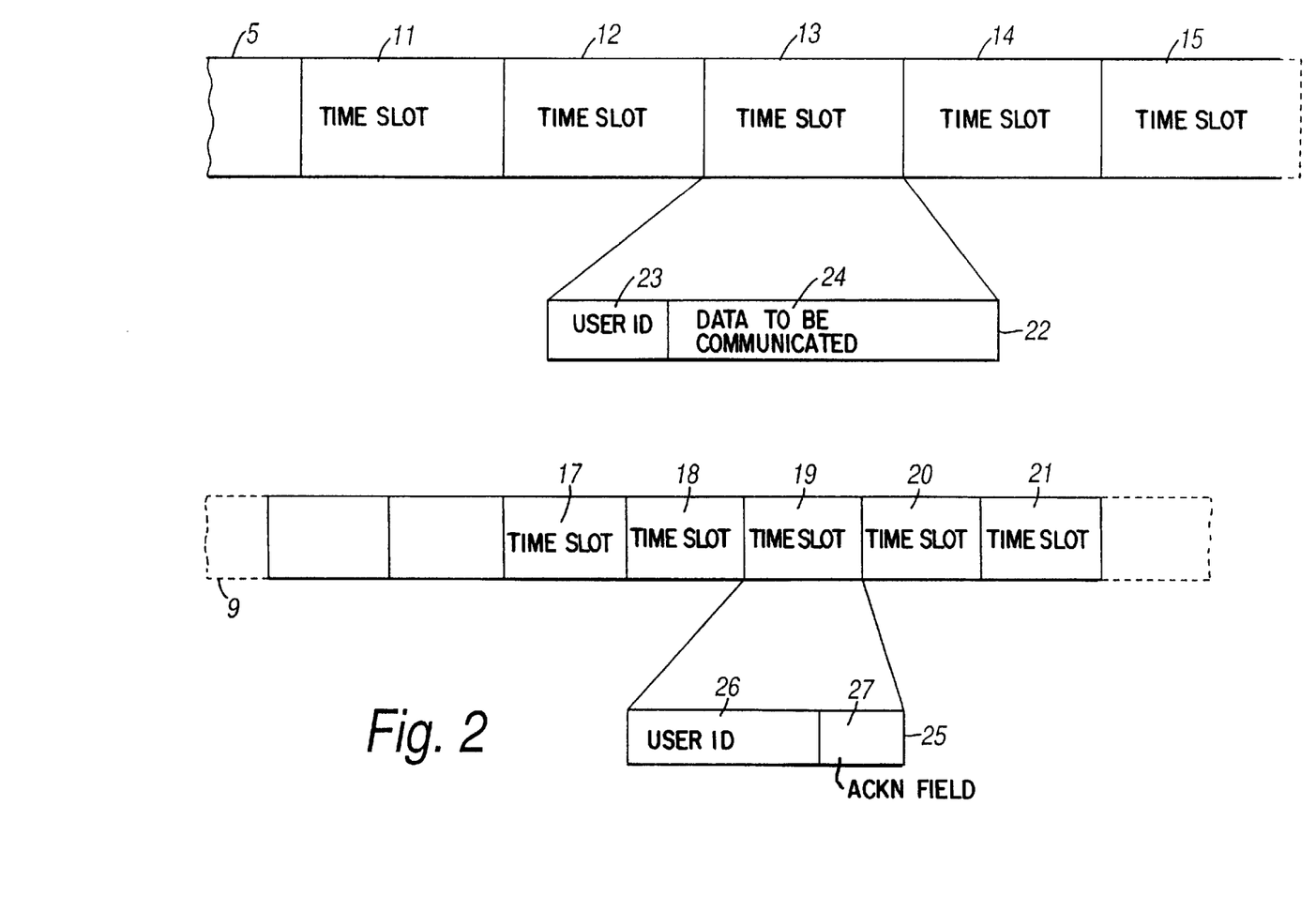
FIG. 2 is a conceptual diagram of a time divided broadcast channel and an acknowledgement channel.

An example of the transmission of radio packets on the common communication channel 5, provided with the packet radio system may be seen in FIG. 2, wherein parts also appearing in FIG. 1 bear the same numerical designations. In FIG. 2 common communication channel 5, is divided into a number of predetermined time slots 11, 12, 13, 14, 15. In accordance with the operation of the urn protocol, any of the user units 1, 2, 3 may be provided with permission to transmit a radio packet 22 in any of the predetermined time slots 11, 12, 13, 14, 15.

Acknowledgements to the transmission of radio packets within the time slots 11, 12, 13, 14, 15, are provided on the acknowledgement channel 9. In this example embodiment the acknowledgement channel 9, comprises a number of predetermined time slots wherein acknowledgements may be transmitted. The predetermined time slots 17, 18, 19, 20, 21 are provided for the transmission of acknowledgement data by the hub station to the mobile units. Acknowledgement time slots for corresponding transmission of packets in the time slots 11, 12, 13, 14, 15, are respectively the time slots 17, 18, 19, 20, 21. In this example embodiment, a mobile user 1, transmits a data packet 22 in time slot 13. A data packet 22 comprises data appertaining to a user ID contained in a field 23, and data to be communicated contained in a field 24. If this data is successfully received by the hub station 6, an acknowledgement is transmitted in the corresponding time slot 19. The acknowledgement data is shown in FIG. 2 as the data packet 25. The data packet 25 comprises data representative of the user ID 26, and an acknowledgement field 27, to indicate successful or unsuccessful reception of the data packet 22.

In order to provide the users 1, 2, 3 with a means whereby they can operate in accordance with the urn protocol in a stable manner, a transmission scheduler is provided within each mobile user 1, 2, 3, which serves to determine whether the mobile user may transmit its information packet in a given time slot.

Figure 3:
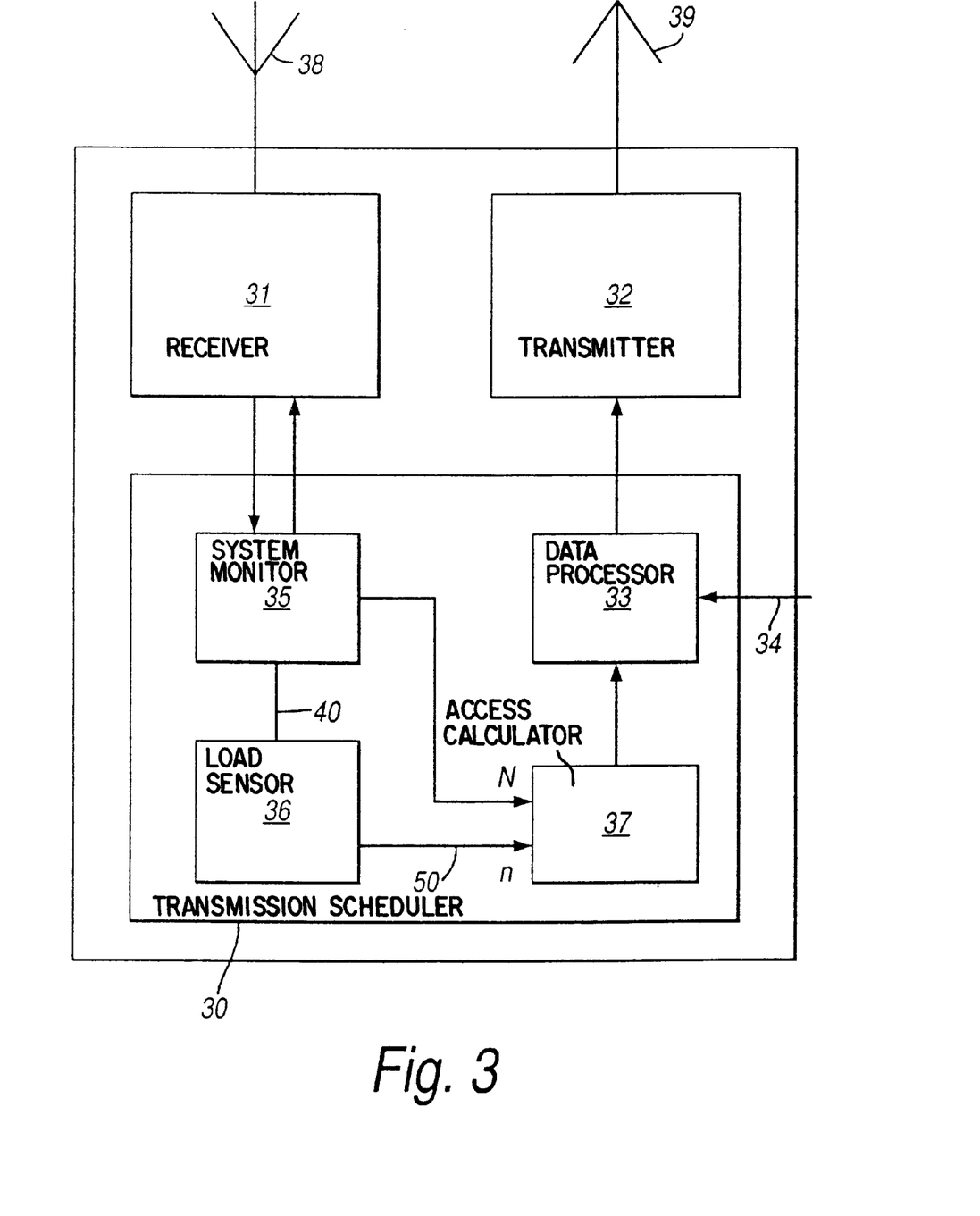
FIG. 3 is a conceptual block diagram of a transmission scheduler for operation in a user unit of the packet radio system, and, FIG. 4 is a block circuit diagram of an apparatus for estimating a number of active users of the packet radio system.

In FIG. 3, part of a mobile user transceiver unit is shown, comprising a transmission scheduler 30, a receiver 31 with a receive antenna 38, and a transmitter 32 with a transmit antenna 39. In FIG. 3, user data to be communicated over the packet radio system is fed to a data processor unit 33, via a conductor 34. The data processor unit 33, forms the data into packets and appends the mobile user's ID number to the packet. The data processor unit 33, is connected to the transmitter 32. The transmitter 32, operates to transmit the data packet formed by the data processor unit 33 via the transmit antenna 39. The receiver 31 is connected to a system monitor 35. The system monitor 35, is connected to the load sensor 36, and both the system monitor 35, and the load sensor 36, are connected to an access calculator 37. An output of the access calculator 37, is connected to the data processor unit 33.

In operation, the system monitor 35, detects system data in combination with the receiver 31, which is transmitted by the hub station in a predetermined time slot at regular intervals. The system data represents the total number of users, present within the packet radio system N. The system data is generated by the hub station in accordance with the number of users which have been registered therewith. The system monitor 36 also operates in combination with the receiver 31, to detect all acknowledgement signals transmitted by the hub station 6. Data representative of the acknowledgements is communicated to the load sensor 36 via a conductor 40. The load sensor 36, operates to generate data representative of an estimate of the number of users n, of the packet radio system which are active within any predetermined time slot. This data is communicated by the load sensor 36, to the access calculator 37 which operates the urn protocol via a conductor 50. The access calculator 37, thereby determines the number of users which have transmission rights k, within any predetermined time slot in accordance with equation 1. The access calculator 37, thereafter selects a set of k numbers from the total set of N numbers in accordance with the protocol hereinbefore described. The access calculator 37, furthermore compares the selected k numbers with the mobile user's own ID number and determines whether that mobile user has permission to transmit in the current time slot. An indication of permission to transmit is thereby communicated by the access calculator 37, to the data processor 33. If however, no data packet is present in the data processor 33, then no packet will be transmitted. The data processor 33 thereafter forwards the data packet to the transmitter for transmission in the predetermined time slot.

In order to provide a means for establishing an accurate estimate of the number of active users n operating within the packet radio system, without the need for a dedicated channel on which mobile users individually indicate activity, the load sensor 36, operates in dependence upon the acknowledgement data sent by the hub station to provide an estimate of the number of active users n.

Figure 4:
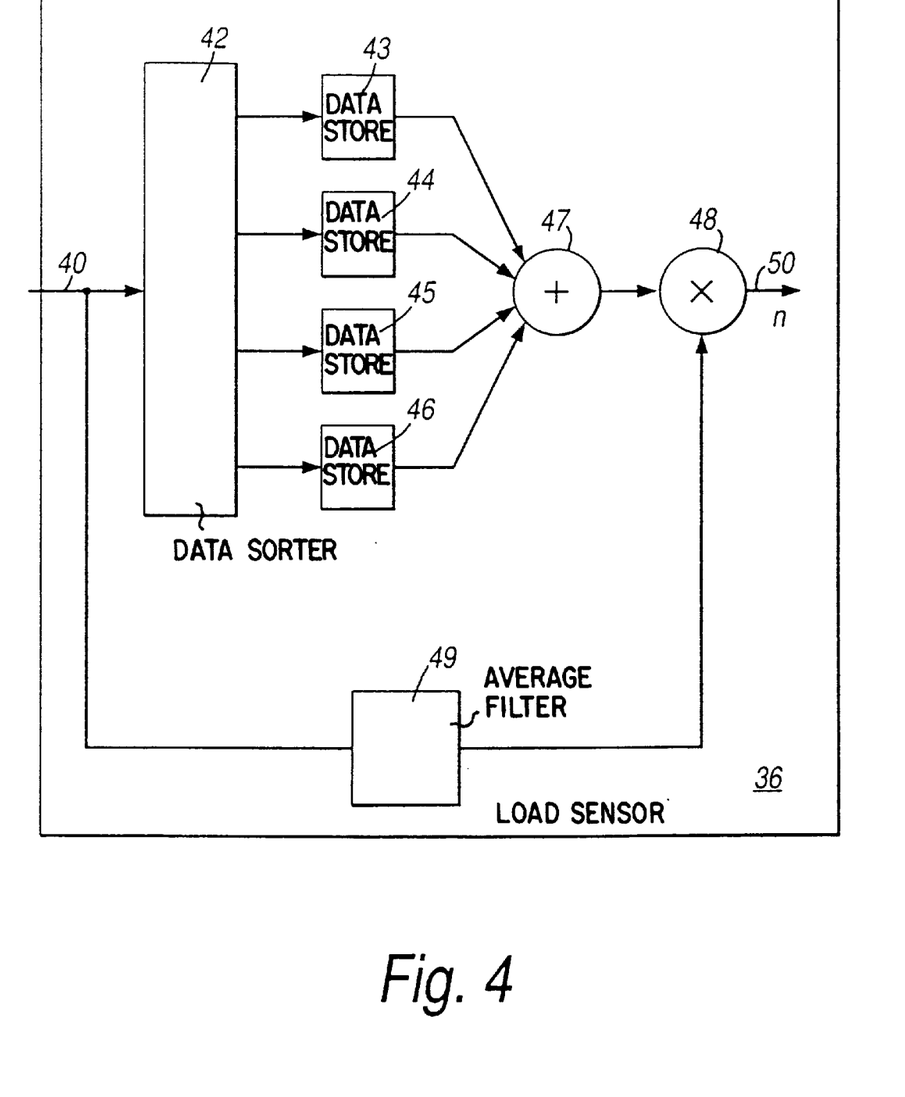

An illustration of the load sensor 36, may be seen in FIG. 4, where parts also appear in FIG. 3 bear identical numerical designations.

In FIG. 4, a data sorter 42 receives data representative of acknowledgements from the system monitor 35, communicated via the conductor 40. The data sorter 42, is connected to each of a number of M data stores 43, 44, 45, 46, which in this example shows M equal to 4. Outputs from each of the data stores 43, 44, 45, 46, are connected to a summing means 47, and an output of the summer 47, is communicated to a data multiplier 48. Also connected to the conductor 40, is a moving average filter 49, an output of which is connected to a second input of the multiplier 48.

In operation, data representative of acknowledgements are fed to the data sorter 42, and to the moving average filter 49, via the conductor 40. The moving average filter 49, operates to calculate a running average of a number of acknowledgements within a window of M time slots, where M is greater than or equal to N. The data sorter 42, operates to sort the acknowledgements by user and furthermore generates data representative of a one if a user was active during the period of M time slots. This data is entered into the data buffers 43, 44, 45, 46. The number of data buffers 43, 44, 45, 46 is equal to the size of the averaging window M. If a user is active within a window, then the data representative of a one is entered into one of the corresponding data buffers 43, 44, 45, 46. The output from the buffers 43, 44, 45, 46, is then summed by the summing means 47, and subsequently multiplied by the multiplier 48, by an output from the moving average filter 49. The result of the multiplication is generated at an output 50. The result is representative of an estimate of a number of active users n, within the packet radio system. The estimate of the number of active users n, is thereafter communicated to the access calculator 37, for processing in accordance with the urn protocol as hereinbefore described.

The load sensor 36, is arranged to form the estimate for a number of active users n, through a combination of the moving average filter 49, data sorter 42, and data buffers 43, 44, 45, 46. An explanation for this arrangement is provided as follows.

In principle the moving average filter 49, provides an estimate of the number of active users n, by averaging the number of acknowledgements during the last M time slots. However it is possible for all packets within the last M time slots to be transmitted by the same user's mobile unit. As such an estimate of n, based on the moving average filter 49, only would provide an incorrect result since this result would indicate that there were M active users in the last M time slots, where in reality only one user was active. The value of k would therefore be calculated on an erroneous basis, causing the urn protocol to provide access rights to only one user in each time slot. For this reason the data sorter 42, and data buffers 43, 44, 45, 46, are arranged to provide data at the output of the summing means 47, indicative of the number of users which have been active in the last M slots. This data is subsequently scaled by the multiplier 48, by the average number of acknowledgements supplied by the moving average filter 49, to provide an overall estimate of the number of active users n.

The urn protocol operates to schedule transmissions of packets, so that the probability of a collision, is minimised as far as possible. In the event however of a collision occurring, a user is provided with a means for detecting this situation from the acknowledgement channel. In this situation, the user mobile will wait for a time period, the duration of which is calculated randomly, and then attempt to re-transmit the radio packet, in a manner similar to an ALOHA protocol. Furthermore, in order for the urn protocol to operate effectively, each mobile user within the packet radio system must operate a pseudo random number generator, which operates to calculate the same set of pseudo random numbers. The selection of k numbers from the pseudo random number generator is required to be synchronised. Therefore each of the mobile users should calculate the same value for k, and thereby select the same k numbers from the number generator. In practice some errors may occur on the feedback channel, thereby causing some mobile users to calculate a different value for n and therefore, a different value for k. This situation would result in a loss of synchronisation in terms of the sequence of numbers generated by respective number generators. The net result of this loss of synchronisation will be to increase the number of collisions in any predetermined time slot. Some tolerance due to errors occurring in the feedback channel may be provided by averaging process used in estimating the value of N, however, this will not obviate the requirement for users to re-synchronise the random number generators in a case where synchronisation is lost. Loss of synchronisation is detected by a mobile, by arranging for the access calculator 37, to monitor the k numbers generated by the urn protocol and store these k numbers in a data store. The number generator is arranged to generate a random permutation of the set of numbers [1 - - - N], each of which set of numbers corresponds to the identification numbers of the N users within the system. Furthermore, once a number has been selected from the set of N numbers, it is not selected again until all users have been selected. This is achieved by arranging for each user and the hub station to remember each user that has been selected since the last re-synchronisation or reset of the protocol. The process of selecting k numbers continues for each time slot, with the effect that all the remaining numbers belonging to the set 1 to N are selected.

In each time slot the new permutation is examined sequentially to select the k users that have access rights in that time slot. Synchronisation of this procedure requires knowledge of a point at which all N users have been selected by the number generators. This may be achieved by providing the hub station with a means for generating the same set of random numbers and by monitoring the transmission from each of the respective users in accordance with the urn protocol generated within each mobile user. The hub station is thereby provided with a means for determining the point at which reset of the system should be generated, in a situation where not all N user identification numbers have been transmitted within any one cycle. As hereinbefore indicated, the hub station broadcasts the current value of N which is updated when new mobile users register with the packet radio system.

As will be appreciated by the cognoscenti, various modifications may be made to the arrangements hereinbefore described without departing from the scope of the invention and for example although the packet radio system has been described with application to satellite communications, the packet radio system may be applied to any other system wherein a significant delay exists in providing mobile users with a feedback of successfully transmitted packet, and wherein an assessment of a number of active users in the system is required.

What is claimed is:

1. A multiple access method for use in a packet radio system wherein a time for providing a plurality of users of the system with acknowledgement data appertaining to successful transmission of packets of data bearing radio signals is large in comparison with a rate of demand for communication of data, which multiple access method comprises steps of
   (i) determining a total number of users N which have been registered with the system
   (ii) communicating the total number of users N to all users in the system,
   characterised by the steps of
      (iii) for each user determining whether the user has permission to transmit a packet in a predetermined time period in accordance with the total number of users N and a number of active users n,
      (iv) monitoring the acknowledgement data,
      (v) for each user estimating the number of active users n, from the acknowledgement data received by the user in a pre-determined time period.

2. A multiple access method as claimed in claim 1, wherein step (v) further comprises, for each of the plurality of users the steps of (vi) storing the acknowledgement data appertaining to a predetermined number of past time periods,
   (vii) calculating first data representative of an average number of acknowledgements received in the predetermined number of past time periods,
   (viii) sorting and arranging the acknowledgement data so that each of the predetermined number of acknowledgements is identified and associated with a corresponding user,
   (ix) calculating second data representative of a sum of the number of users which were active in the predetermined number of past time periods,
   (x) forming a product of first and second data representative of the estimate of the number of active users, n.

3. A multiple access method as claimed in claim 1, wherein step (iii) further comprises for each of the plurality of users, the steps of, (xi) calculating a number k representative of users with permission to transmit in a predetermined time period, in accordance with a total number of users N and the estimate of the number of active users n,
(xii) selecting a set of k identification numbers from a set of N identification numbers, each of which identification numbers represents a user of the system, and
(xiii) determining for each user whether the identification number for the user is present in one of the k selected identification numbers and arranging for the user to transmit a packet in a pre-determined time slot if the identification number is present.

4. A multiple access method as claimed in claim 3, wherein step (xi) comprises for each of the plurality of users the step of,
   dividing the total number of users N, by the estimate of the number of active users n.

5. A transmission scheduler for use within each of a plurality of user units of a packet radio system, the packet radio system including a common communication channel for providing the user units with a means for transmitting packets of data bearing radio signals in predetermined time periods, and a hub station which operates to detect the data packets and transmits acknowledgement data appertaining to a successful transmission of a data packet by a user unit, wherein a delay between a user unit transmitting a data packet and receiving corresponding acknowledgement data is large in comparison with a rate at which user units are required to communicate data packets, characterised in that the transmission scheduler comprises,
   a monitor means which operates to monitor acknowledgement data transmitted by the hub station,
   a load sensor means which operates to generate load data representative of a number of active user units with data packets to be transmitted,
   an access calculator which operates to generate authorisation data in dependence upon the load data, which authorisation data is indicative of users which are provided with permission to transmit, and a
   transmitter which operates to transmit a data packet in dependence upon the authorisation data, wherein
      the load sensor means comprises a data processor means which operates to generate the load data in dependence upon an average number of acknowledgement data received in a pre-determined time, thereby providing the packet radio system with a means for stable operation in spite of the delay in receiving acknowledgements.

6. A transmission scheduler for use within each of a plurality of user units of a packet radio system as claimed in claim 5, wherein the load sensor comprises, an averaging filter which operates to generate first data representative of an average number of acknowledgements received within the predetermined time.

7. A transmission scheduler for use within each of a plurality of user units of a packet radio system as claimed in claim 6, wherein the load sensor further comprises, a data sorter which operates to identify and associate the acknowledgement data with user units to which the acknowledgement data was directed, an accumulator means which operates to generate second data in combination with the data sorter representative of a number of active user units within the predetermined time, and a scaling means which operates to generate the load data in dependence upon the first and the second data.

8. A transmission scheduler as claimed in claim 7, wherein the scaling means is a multiplier which operates to multiply first and second data to generate load data.

9. A transmission scheduler as claimed in claim 5, wherein the access calculator comprises a second data processor which operates to generate third data representative of a number of identification numbers to be generated, and a data selector, which operates to select the number of identification numbers from a set of identification numbers, each of which set identification numbers being representative of a user unit, the selected identification numbers being representative of the authorisation data.

10. A transmission scheduler as claimed in claim 9, wherein the monitor means further operates to monitor system data transmitted by the hub station, which system data is representative of a total number of user units of the system.

11. A transmission scheduler as claimed in claim 9, wherein the second data processor calculates the number of identification numbers from a result of scaling the system data with the load data.

12. A transmission scheduler as claimed in claim 9, wherein the data selector comprises a pseudo-random number generator initialised with a predetermined seed, which operates to select a set of pseudo-random numbers representative of the number of identification numbers.

13. A transmission scheduler as claimed in claim 5, further comprising a third data processor connected to the access calculator and to a transmitter which operates to form data to be transmitted into packets which include an identification of the user unit, and for communicating packets to the transmitter when the authorisation data contains the identification number of the user unit.

14. A method of maintaining synchronisation of a plurality of transmission schedulers embodied within a corresponding plurality of user units, which transmission schedulers operate to schedule transmissions of packets of data bearing radio signals on a common communications channel in accordance with acknowledgement data received from a hub station appertaining to successfully transmitted packets, and in accordance with a set of numbers drawn from a pre-determined set of numbers, each of which pre-determined set of numbers being representative of a user unit with permission to transmit packets, the said method comprises the steps of;

(i) monitoring the packets received by the hub station, (ii) generating monitor data representative of user units which have transmitted packets during a predetermined synchronisation period, (iii) generating prediction data representative of the user units which should have transmitted packets in accordance with the operation of the said plurality of transmission schedulers, (iv) transmitting re-synchronisation data to all user units at the end of the said pre-determined synchronisation period when the monitor data in combination with prediction data indicates that at least one of the transmission schedulers is out of synchronisation.

15. A method of maintaining synchronisation of a plurality of transmission schedulers embodied within a corresponding plurality of user units as claimed in claim 14, wherein step (iii) comprises the steps of;

(v) calculating a number of active user units in accordance with the monitor data appertaining to the number of user units which have transmitted packets within a predetermined averaging period, (vi) calculating a number of numbers drawn from the pre-determined set of numbers in accordance with the number of active user units and a total number of the said user units, (v) drawing the number of numbers from the pre-determined set of numbers, and storing these numbers, which numbers are representative of the prediction data.

16. A packet radio system, comprising a common communications channel for providing a plurality of user units with a means for transmitting packets of data bearing radio signals in predetermined time periods, and a hub station which operates to detect the data packets and transmit acknowledgement data appertaining to successfully transmitted packets, wherein each of the said plurality of user units is provided with a transmission scheduler, which transmission schedule operates to schedule transmissions of packets in accordance with the acknowledgement data in combination with numbers drawn from a predetermined set of numbers, each of which predetermined set of numbers represents a user unit, and wherein the hub station comprises a packet predictor which operates to generate prediction data representative of user units which in accordance with the numbers drawn from the pre-determined set of numbers should have transmitted packets, a packet monitor means, which operates to detect which user units have transmitted packets within a pre-determined synchronisation period, and a re-synchronisation detector which operates in combination with the packet predictor and the packet monitor means to transmit re-synchronisation data to user units at the end of the pre-determined synchronisation period when the prediction data indicates that at least one transmission scheduler is out of synchronisation.

17. A packet radio system as claimed in claim 16, wherein the said plurality of transmission schedulers operates to calculate a number of numbers drawn from the pre-determined set of numbers in accordance with an estimate of the number of active user units and a total number of user units, and the packet predictor operates to calculate the number of numbers drawn from the pre-determined set of numbers in accordance with the total number of user units and the number of user units which have transmitted packets, as detected by the packet monitor means.

18. A packet radio system as claimed in claim 17, wherein the said plurality of transmission schedulers operate to calculate the estimate of the active number of user units in accordance with a number of acknowledgement data received in a pre-determined averaging period.

19. A packet radio system as claimed in claim 18, wherein the transmission schedulers and the packet predictor each include a pseudo-random number generator which operates to select the number of numbers from the said pre-determined set in a pseudo-random way, and wherein the pseudo-random number generator is provided with same pre-determined seed.

* * * * *